Figure 1:
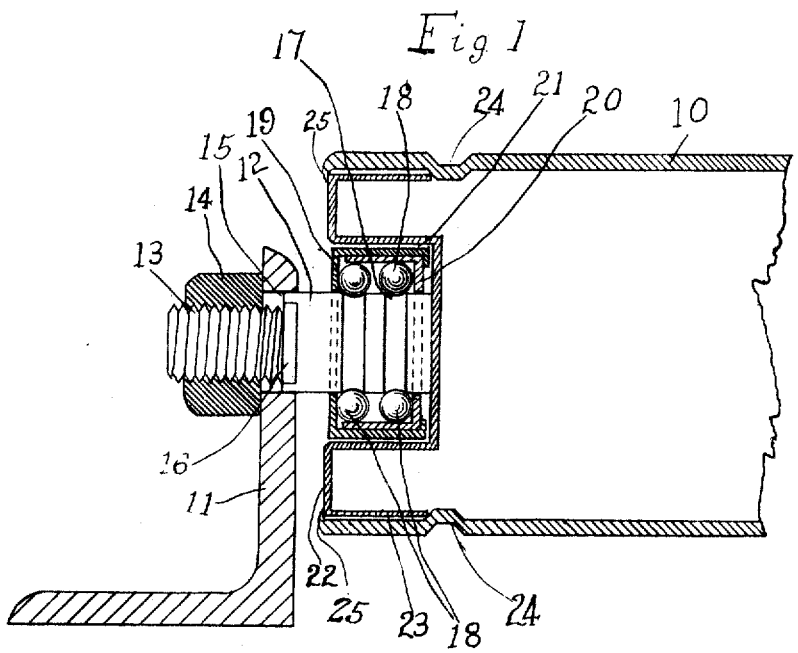
Figure 2:
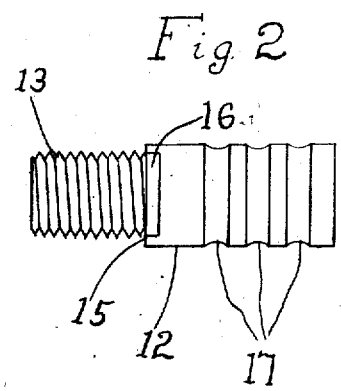

P. C. WEGO.
BEARING FOR CONVEYER ROLLERS.
APPLICATION FILED OCT. 20, 1919.

1,353,874.

Patented Sept. 28, 1920.

Inventor:
Peter C. Wego.
By: John F. Thyken
    Attorney.

UNITED STATES PATENT OFFICE.

PETER C. WEGO, OF ST. PAUL, MINNESOTA.

BEARING FOR CONVEYER-ROLLERS.

1,353,874.

Specification of Letters Patent.   Patented Sept. 28, 1920.

Application filed October 20, 1919.  Serial No. 331,927.

*To all whom it may concern:*

Be it known that I, PETER C. WEGO, a citizen of the United States, residing at St. Paul, in the county of Ramsey and State of Minnesota, have invented new and useful Improvements in Bearings for Conveyer-Rollers, of which the following is a specification.

My invention relates to bearings for conveyer rollers.

Said invention is an improvement upon the gravity carrier, described and claimed in the application of Charles H. Lister, Serial No. 232881. filed May 6, 1918, and allowed Jan. 7, 1920.

The object of my invention is to provide a stud bearing with rigid supports in the side rail of the conveyer and a stable journal for the roller.

A further object is to promote efficiency and durability in this class of bearings.

In the drawings Figure I is a vertical section of one of my bearings, and Fig. II is a plan of a modified form of stud for such a bearing.

In the drawings the numeral 10 indicates a tubular roller, and 11 an angle iron forming one of the parallel supports for a series of rollers. Only one support and one end of the roller is shown, but it is to be understood that the construction is duplicated at the opposite end of the roller. The stud 12 is threaded at its outer end 13 which passes through an opening in the angle iron 11, and a lock nut 14, in conjunction with a shoulder 15 formed on the stud, is adapted to clamp the stud upon the angle iron 11. Additional rigidity of this union is secured by cutting out opposite parallel segments 16 from the shoulder 15 to fit corresponding surfaces in the margin of the opening through the angle iron 11, and thereby prevent any turning movement of the stud in the supporting angle iron. A plurality of peripheral grooves 17 are formed in the inner end of the stud 12 to furnish race-ways for a series of anti-friction balls 18. In Fig. I two of these race-ways are shown and in the alternate construction of Fig. II three are shown, to provide for a longer bearing in case of conveyers intended for unusually heavy work, it being obvious that greater stability and less strain will result from supporting the moving parts on several rings of balls in parallel races.

The cage or ball retainer is formed in two parts 19 and 20, the latter of which telescopes within the former and forms the outer bearing surface for the balls 18. The outer surface of the ball retainer is cylindrical in contour, and is adapted to snugly but revolubly fit the interior of a cylindrical cavity 21 formed in the cap 22 which incloses the ends of the roller. The long cylindrical bearing surface between the ball retainer and cavity 21, in conjunction with the plurality of parallel ball race-ways, furnishes a stable support for the roller 10. The cap 22 is also provided with an annular peripheral flange 23 which fits into the end of the tubing forming the roller, and is fixed therein by the punched depressions 24 and the crimped end 25 of the tubing.

Having described my invention what I claim as new and desire to protect by Letters Patent is:

1. In a bearing for conveyer rollers, a stud having a threaded outer end, an inner end formed with a shoulder and a plurality of peripheral grooves, a series of balls in each of said grooves, a cylindrical cage for said balls, a roller cap provided with a cylindrical axial cavity adapted to snugly but revolubly fit said cage and means for locking the stud in a support.

2. In a bearing for conveyer rollers, a stud having a plurality of peripheral grooves, a series of balls in each of said grooves, a cylindrical cage for said balls, a roller cap provided with a cylindrical axial cavity adapted to snugly but revolubly fit said cage and means for locking the stud in the support and said cap in a roller.

3. In a bearing for conveyer rollers, a stud having a threaded outer end, an inner end formed with an annular shoulder, having portions of its periphery cut away, and a plurality of peripheral grooves, a support formed with an opening engaging said shoulder, a series of balls in each of said grooves, a cylindrical cage for said balls, a roller provided with a cylindrical axial cavity for said cage and a locking nut on the outer extremity of said stud.

4. In a bearing for conveyer rollers, a support formed with oblong perforations, a stud formed with an annular shoulder and a plurality of peripheral grooves, a series of balls in each of said grooves, a cylindrical cage for said balls, a roller cap provided with a cylindrical axial cavity for said cage, means for locking the shoulder in the support, comprising threads on the stud, a nut outside the support engaging said threads and parallel recesses in the shoulder adapted to engage the lateral edges of one of the perforations in said support.

In testimony whereof, I have hereunto signed my name to this specification.

PETER C. WEGO.